(12) United States Patent
Kim et al.

(10) Patent No.: US 8,138,295 B2
(45) Date of Patent: Mar. 20, 2012

(54) POLYCARBONATE-POLYSILOXANE COPOLYMER RESIN COMPOSITION WITH HIGH IMPACT STRENGTH AT LOW TEMPERATURE AND MECHANICAL STRENGTH AND METHOD FOR PREPARING THE SAME

(75) Inventors: Bo Young Kim, Seoul (KR); Tae Gon Kang, Suwon-si (KR); Jong Cheol Lim, Anyang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 12/485,153

(22) Filed: Jun. 16, 2009

(65) Prior Publication Data

US 2009/0253855 A1     Oct. 8, 2009

Related U.S. Application Data

(63) Continuation-in-part of application No. PCT/KR2007/006990, filed on Dec. 28, 2007.

(30) Foreign Application Priority Data

Dec. 29, 2006  (KR) .................. 10-2006-0138052

(51) Int. Cl.
 *C08G 77/04* (2006.01)
 *C08G 77/26* (2006.01)
 *C08F 283/02* (2006.01)
 *C08L 83/08* (2006.01)
(52) U.S. Cl. ................ 528/25; 525/464; 525/101
(58) Field of Classification Search ............ 528/25
 See application file for complete search history.

(56) References Cited

U.S. PATENT DOCUMENTS

| | | | |
|---|---|---|---|
| 4,395,527 A | 7/1983 | Berger et al. | |
| 4,480,009 A | 10/1984 | Berger et al. | |
| 4,499,149 A | 2/1985 | Berger et al. | |
| 4,994,532 A | 2/1991 | Hawkins et al. | |
| 5,194,524 A | 3/1993 | Peters | |
| 5,530,083 A | 6/1996 | Phelps et al. | |
| 6,416,817 B1 | 7/2002 | Rangwalla et al. | |
| 6,677,047 B2 * | 1/2004 | Matsumura et al. | 428/447 |
| 6,706,825 B2 * | 3/2004 | Itagaki et al. | 525/464 |
| 2002/0022692 A1 * | 2/2002 | Okamoto et al. | 525/67 |
| 2008/0177000 A1 * | 7/2008 | Ahn et al. | 525/95 |

FOREIGN PATENT DOCUMENTS

| | | | |
|---|---|---|---|
| JP | 10307409 A | * | 11/1998 |
| JP | 2004035726 | * | 2/2004 |
| KR | 10-1986-0002192 B1 | | 12/1986 |
| WO | 2008/082220 A1 | | 7/2008 |

OTHER PUBLICATIONS

Flick, Ernest, Plastics Additive An Industrial Guide, 2002, Noyes Publications, Third Edition vol. II.*
Flick, E.W.; Plastic Additives An Industrial Guide; 2002 Noyes Publications/William Andrew Publishing; 3rd Edition; vol. 2; p. 7.*
Machine translation of JP-10307409, 67 pages, translation generated Nov. 2011.*
Machine translation of JP-2004035726, 44 pages, translation generated Nov. 2011.*
International Search Report in counterpart International Application No. PCT/KR2007/006990, dated Mar. 25, 2008.

* cited by examiner

*Primary Examiner* — Robert Loewe
(74) *Attorney, Agent, or Firm* — Summa, Additon & Ashe, P.A.

(57) ABSTRACT

Disclosed herein is a polycarbonate-polysiloxane copolymer resin composition comprising: (A) about 100 parts by weight of a thermoplastic polycarbonate resin; and (B) about 0.1 to about 30 parts by weight of an organic siloxane polymer having a primary amine group. The polycarbonate-polysiloxane copolymer resin composition has high impact strength at low temperature and high mechanical strength.

13 Claims, No Drawings

POLYCARBONATE-POLYSILOXANE COPOLYMER RESIN COMPOSITION WITH HIGH IMPACT STRENGTH AT LOW TEMPERATURE AND MECHANICAL STRENGTH AND METHOD FOR PREPARING THE SAME

CROSS-REFERENCE TO RELATED APPLICATIONS

This non-provisional application is a continuation-in-part application of PCT Application No. PCT/KR2007/006990, filed Dec. 28, 2007, pending, which designates the U.S. and which is hereby incorporated by reference in its entirety, and claims priority therefrom under 35 USC Section 120. This application also claims priority under 35 USC Section 119 from Korean Patent Application No. 10-2006-0138052, filed Dec. 29, 2006, the entire disclosure of which is also hereby incorporated by reference.

FIELD OF THE INVENTION

The present invention relates to a polycarbonate-polysiloxane copolymer resin composition.

BACKGROUND OF THE INVENTION

Polycarbonate-polysiloxane copolymers and methods for preparing the same have been widely studied for many years. In general, polycarbonate-polysiloxane copolymers have been prepared by interfacial polymerization processes. For example, U.S. Pat. No. 5,530,083 discloses a method for preparing a silicone polycarbonate block copolymer using an interfacial phosgenation reaction in which an aromatic dihydroxy compound, phosgene and a catalyst are reacted with a hydroxyaryl terminated polydiorganosiloxane. However, this method uses a chlorinated solvent that is harmful to the environment.

U.S. Pat. No. 4,994,532 discloses a process of preparing a polycarbonate-silicone block copolymer by melt-blending a polycarbonate resin and a polydimethylsiloxane having a functional carboxylic acid group. In addition, U.S. Pat. No. 5,194,524 discloses a process for producing a copolymer by melt-mixing siloxane compounds having at least one secondary amine group and polycarbonate resins through a conventional extruder. According to the '524 patent, the polysiloxane having a secondary amine group is more effective for the reactive extrusion than a polysiloxane having a primary amine group, due to relatively low hydrolytic stability of primary amines.

Methods using a melt mixing process have some advantages, such as the use of a conventional melt extruder and a simple process. The resultant copolymers, however, can have low impact strength at low temperatures and low mechanical strength.

SUMMARY OF THE INVENTION

The present inventors have developed a polycarbonate-polysiloxane copolymer resin composition with high impact strength at low temperatures as well as high mechanical strength and a method for preparing the same. The polycarbonate-polysiloxane copolymer resin composition can also have a good balance of physical properties such as impact resistance, thermal stability, workability and appearance.

The polycarbonate-polysiloxane copolymer resin composition according to the present invention comprises (A) about 100 parts by weight of a thermoplastic polycarbonate resin and (B) about 0.1 to about 30 parts by weight of an organic siloxane polymer having a primary amine group.

In an exemplary embodiment of the invention, the polycarbonate-polysiloxane copolymer resin composition can have an impact strength of about 35 kgf·cm/cm or more at 23° C. measured in accordance with ASTM D-256 using a ¼" thick test sample, an impact strength of about 18 kgf·cm/cm or more at −20° C. and about 15 kgf·cm/cm or more at −30° C., respectively, measured in accordance with ASTM D-256 using a ¼" thick test sample, and a flexural modulus of about 21,000 kgf/cm$^2$ or more measured in accordance with ASTM D790 using a ¼" thick test sample.

The resin composition may further comprise an impact modifier to improve the impact strength. The impact modifier may be present in the composition in an amount of less than about 10 parts by weight.

In an exemplary embodiment of the invention, the impact modifier is a core-shell graft copolymer.

In exemplary embodiments including an impact modifier, the polycarbonate-polysiloxane copolymer resin composition can have an impact strength of about 70 kgf cm/cm or more at 23° C. measured in accordance with ASTM D-256 using a ¼" thick test sample, an impact strength of about 55 kgf·cm/cm or more at −20° C. and about 34 kgf·cm/cm or more at −30° C. measured in accordance with ASTM D-256 using a ¼" thick test sample, and a flexural modulus of about 21,000 kgf/cm$^2$ or more measured in accordance with ASTM D790 using a ¼" thick test sample.

In another exemplary embodiment of the invention, the impact modifier is an ethylene/alkyl (meth)acrylate copolymer.

The resin composition of the invention may further include one or more additives selected from flame retardants, flame retardant aids, lubricants, releasing agents, nucleating agents, antistatic agents, stabilizers, modifiers, inorganic fillers, pigments, dyes, and the like and combinations thereof.

Another aspect of the present invention relates to a method for preparing a polycarbonate-polysiloxane copolymer. The method comprises melt-kneading (melt mixing or melt blending) a thermoplastic polycarbonate resin and an organic siloxane polymer having a primary amine group and extruding the melt-kneaded (melt mixed or melt blended) mixture through an extruder.

The copolymer of the present invention now will be described more fully hereinafter in the following detailed description of the invention.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

(A) Polycarbonate Resin

The polycarbonate resin of the present invention is prepared by reacting a diphenol represented by the following Chemical Formula 1 with a phosgene, a halogen formate or a carbonic diester.

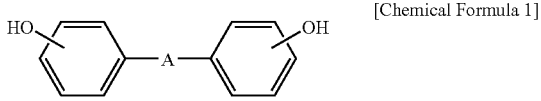
[Chemical Formula 1]

wherein A is a single bond, substituted or unsubstituted $C_{1-5}$ alkylene, substituted or unsubstituted $C_{1-5}$ alkylidene, substituted or unsubstituted $C_{3-6}$ cycloalkylene, substituted or unsubstituted $C_{5-6}$ cycloalkylidene, substituted or unsubstituted $C_{2-5}$ alkenylene, substituted or unsubstituted $C_{5-6}$ cycloalkenylene, CO, —S— or —SO$_2$—.

Examples of the diphenol represented by Chemical Formula 1 may include without limitation hydroquinone, resorcinol, 4,4'-dihydroxydiphenyl, 2,2-bis-(4-hydroxyphenyl)-propane (also referred to in the art as "bisphenol-A"), 2,4-bis-(4-hydroxyphenyl)-2-methylbutane, 1,1-bis-(4-hydroxyphenyl)-cyclohexane, 2,2-bis-(3-chloro-4-hydroxyphenyl)-propane, 2,2-bis-(3,5-dichloro-4-hydroxyphenyl)-propane and the like, and combinations thereof.

In the present invention, the polycarbonate resin can have a weight average molecular weight (Mw) of about 10,000 to about 500,000, for example about 25,000 to about 100,000.

In accordance with various embodiments of the invention, suitable polycarbonates incorporated into the composition of the present invention may be branched in a known manner for example by incorporating about 0.05 to about 2 mol %, based on the total quantity of diphenols used, of tri- or higher functional compounds, for example, those with three or more phenolic groups.

A homopolymer of polycarbonate, a copolymer of polycarbonate, or a combination thereof may be used in the preparation of resin composition of the present invention.

(B) Organic Siloxane Polymer Having a Primary Amine Group

The organic siloxane polymer of the present invention comprises an organic siloxane polymer comprising a primary amine group represented by the following Chemical Formula 2.

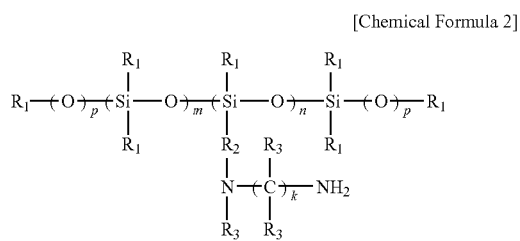
[Chemical Formula 2]

wherein:
each $R_1$ is independently hydrogen $C_{1-8}$ alkyl, $C_{6-30}$ aryl, or $C_1$-$C_{15}$ alkyl-substituted $C_{6-30}$ aryl;
$R_2$ is $C_{1-8}$ alkylene;
each $R_3$ is independently hydrogen, $C_{1-8}$ alkyl, $C_{6-30}$ aryl, or $C_1$-$C_{15}$ alkyl-substituted $C_{6-30}$ aryl;
each p is independently 0 or 1;
k is an integer from of 1 to 5; and
m and n represent a ratio of repeating units and m:n is about 99.9:0.1 to about 50:50, for example about 99.5:0.5 to 55:45.

For example, each $R_1$ and $R_3$ can independently be hydrogen or $C_{1-8}$ alkyl. As another example, each $R_1$ and $R_3$ can independently include hydrogen, methyl, ethyl, propyl, isopropyl, butyl, sec-butyl, t-butyl, isobutyl, isoamyl, t-amyl, and the like.

$R_2$ can be methylene, ethylene, propylene, isopropylene, butylene, sec-butylene or t-butylene.

The organic siloxane polymer containing a primary amine group may include a secondary amine group as shown in Chemical Formula 2.

The viscosity of the organic siloxane polymer having a primary amine group used in the preparation of the resin composition can be, but is not limited to, about 1 to about 100,000 centistocks (cSt) at 25° C., for example about 10 to about 80,000 cSt taking into account the required workability.

The organic siloxane polymer having a primary amine group (B) of the present invention is used in an amount of about 0.1 to about 30 parts by weight, for example about 0.2 to about 20 parts by weight, and as another example about 0.5 to about 15 parts by weight, based on about 100 parts of the polycarbonate resin (A). In those ranges, good mechanical properties may be obtained.

(C) Impact Modifier

In exemplary embodiments, a conventional impact modifier may be optionally used to improve impact strength.

In exemplary embodiments of the invention, the impact modifier may be a core-shell graft copolymer.

The core-shell graft copolymer can be prepared by grafting a rubber polymer with a monomer such as an aromatic vinyl compound, cyanide vinyl compound, $C_1$-$C_8$ (meth)acrylic acid alkyl ester, maleic anhydride, maleimide, or a combination thereof.

For example, the core-shell graft copolymer may be prepared by graft copolymerizing about 5 to about 95% by weight of at least one monomer selected from styrene, αmethylstyrene, halogen- or $C_1$-$C_8$ alkyl-substituted styrene, $C_1$-$C_8$ methacrylic acid alkyl ester, $C_1$-$C_8$ acrylic acid alkyl ester, acrylonitrile, methacrylonitrile, maleic anhydride, $C_1$-$C_4$ alkyl- or phenyl N-substituted maleimide or a combination thereof onto about 5 to about 95% by weight of a rubber polymer selected from butadiene rubber, acrylic rubber, ethylene/propylene rubber, styrene/butadiene rubber, acrylonitrile/butadiene rubber, isoprene rubber, ethylene-propylene-diene terpolymer (EPDM), polyorganosiloxane/polyalkyl (meth)acrylate rubber complex or a combination thereof.

The $C_1$-$C_8$ methacrylic acid alkyl ester or $C_1$-$C_8$ acrylic acid alkyl ester can be obtained from a methacrylic acid or an acrylic acid respectively and a monohydric alcohol containing 1 to 8 carbon atoms. Examples of the acid alkyl ester may include without limitation methyl methacrylate, ethyl methacrylate, ethyl acrylate, methyl acrylate, propyl methacrylate, and the like, and combinations thereof.

One embodiment of the core-shell graft impact modifier is a graft copolymer obtained by graft polymerizing a mixture of styrene, acrylonitrile and optionally (meth)acrylic acid alkyl ester onto butadiene rubber, acrylic rubber, or styrene/butadiene rubber.

Another embodiment of the core-shell graft impact modifier is a graft copolymer obtained by graft polymerizing (meth)acrylic acid alkyl ester monomer onto a rubber mixture of polyorganosiloxane/polyalkyl (meth)acrylate rubber with butadiene rubber, acrylic rubber, and/or styrene/butadiene rubber.

The rubber polymer may have an average particle size of about 0.05 to about 4 μm to improve impact strength and the appearance of a molded article.

The graft impact modifier according to the present invention can be prepared using a conventional polymerization process such as emulsion polymerization, suspension polymerization, solution polymerization, or bulk polymerization. In emulsion and bulk polymerizations, the monomers are added to the rubber polymer in the presence of a polymerization initiator.

In another embodiment of the invention, the impact modifier may be a linear impact modifier, for example, an ethylene/alkyl (meth)acrylate copolymer.

The ethylene/alkyl (meth)acrylate copolymer may be represented by the following Chemical Formula 3.

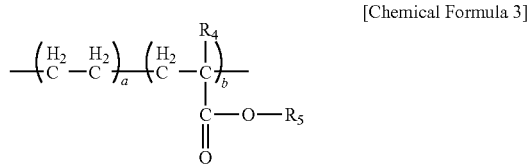

[Chemical Formula 3]

wherein:
$R_4$ is hydrogen or methyl;
$R_5$ is $C_1$-$C_{12}$ alkyl;
a and b are the degree of polymerization, and a:b is about 300:1 to about 10:90.

$R_5$ can be, for example, methyl, ethyl, propyl, isopropyl, butyl, sec-butyl, t-butyl, isobutyl, isoamyl, or t-amyl.

The ethylene/alkyl (meth)acrylate copolymer may be a random copolymer, a block copolymer, a multiblock copolymer, a graft copolymer, or a combination thereof. The ethylene/alkyl (meth)acrylate copolymer may be readily prepared by one of ordinary skill in the art without undue experimentation.

In the present invention, a mixture of the core-shell graft copolymer and the ethylene/alkyl(meth)acrylate copolymer may also be used.

The impact modifier can be present in the composition of the invention in an amount of about 10 parts by weight or less, for example about 0.1 to about 7 parts by weight, and as another example about 0.5 to about 5.5 parts by weight, based on the total weight of a base resin including components (A) and (B) as described herein. The use of impact modifier in these ranges can provide desired mechanical strength to the composition.

The polycarbonate-polysiloxane copolymer resin composition of the invention may further comprise conventional additives such as but not limited to flame retardants, flame retardant aids, lubricants, releasing agents, nucleating agents, antistatic agents, stabilizers, modifiers, inorganic fillers, pigments, dyes, and the like. These additives can be used alone or in combination with one another. The inorganic additives may be present in the composition in an amount of about 0 to about 60 parts by weight, for example about 1 to about 40 parts by weight, based on about 100 parts by weight of a base resin including components (A) and (B) as described herein.

The polycarbonate-polysiloxane copolymer of the invention may be prepared by melt-blending a thermoplastic polycarbonate resin and an organic siloxane polymer having a primary amine group and extruding the melt-blended mixture. The mixture can be extruded at a temperature of about 200 to about 300° C., for example about 250 to about 280° C. The composition can be extruded into pellet form. The pellets can be molded using a conventional process into interior/exterior parts of electric and electronic goods such as TV housings, washing machines, telephones, audio sets, video players, CD players, and the like.

The invention may be better understood by reference to the following examples which are intended for the purpose of illustration and are not to be construed as in any way limiting the scope of the present invention, which is defined in the claims appended hereto.

EXAMPLES

The compound specifications of (A) the polycarbonate resin, (B) the organic siloxane polymer containing a primary amine group, and (C) the impact modifier used in the Examples and Comparative Examples will be described more fully hereinafter.

(A) Polycarbonate Resin
Bisphenol-A based polycarbonate with a weight average molecular weight of 25,000 (Mw) is used.

(B) Organic Siloxane Polymer Containing a Primary Amine Group (B-1) The organic siloxane polymer having a dynamic viscosity of 1,000 cSt at 25° C. and represented by the above Chemical Formula 2 in which the ratio of m to n is 98.7:1.3; $R_1$ is methyl; $R_2$ is propylene; $R_3$ is hydrogen; p is 0; and k is 2 is used.

(B-2) polydimethylsiloxane having a dynamic viscosity of 100 cSt at 25° C. manufactured by Shinetsu Co. of Japan (KF-96) is used.

(B-3) Siloxane polymer containing a secondary amine group represented by the following Chemical Formula 4 is used.

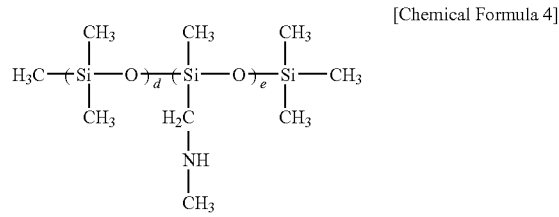

[Chemical Formula 4]

(d:e is 98:2 and the dynamic viscosity is 1,000 cSt at 25° C.)

(C) Impact Modifier
MBS based core-shell graft impact modifier (Metablen C223A) manufactured by MRC Co. of Japan is used.

Examples 1-2 and Comparative Examples 1-4

The components as shown in Table 1 added with antioxidants and thermal stabilizers are mixed in a conventional mixer and the mixture is extruded through a twin screw extruder (L/D=35, Φ=45 mm) into pellets. The resin pellets are molded into test specimens using a 10 oz injection molding machine at 280-300° C.

The physical properties of the test specimens are measured as follows and the results are shown in Table 1 below.

(1) Izod Impact Strength at room temperature: The notch Izod impact strength is measured for ¼" specimens (inch, kgf cm/cm), after exposure at 23° C. and 50% relative humidity for 48 hours in accordance with ASTM D-256.

(2) Izod Impact Strength at low temperature: The notch Izod impact strength is measured for ¼" specimens (inch, kgf cm/cm), after exposure at −20° C. and at −30° C., respectively, for 48 hours in accordance with ASTM D-256.

(3) Flexural Modulus: The flexural modulus is measured after exposure at 23° C. and 50% relative humidity for 48 hours in accordance with ASTM D790 using ¼" thick test samples at 2.8 mm/min velocity.

TABLE 1

|  |  | Examples | | Comparative Examples | | | |
|---|---|---|---|---|---|---|---|
|  |  | 1 | 2 | 1 | 2 | 3 | 4 |
| Contents (parts by weight) | (A) polycarbonate resin | 100 | 100 | 100 | 100 | 100 | 100 |
|  | (B) organic siloxane B-1 | 1.5 | 1.5 | — | — | — | — |
|  | B-2 | — | — | 1.5 | — | 1.5 | 3 |
|  | B-3 | — | — | — | 1.5 | — | — |
|  | (C) impact modifier | — | 1.5 | — | — | 1.5 | 1.5 |
| physical properties | notch impact strength at 23° C. (¼", kgf·cm/cm) | 37 | 75 | 26 | 27 | 67 | 76 |
|  | notch impact strength at −20° C. (¼", kgf·cm/cm) | 20 | 57 | 13 | 14 | 48 | 52 |
|  | notch impact strength at −30° C. (¼", kgf·cm/cm) | 18 | 36 | 10 | 12 | 28 | 33 |
|  | flexural modulus (kgf/cm²) | 21,800 | 21,200 | 20,400 | 19,800 | 18,700 | 18,000 |

As shown in Table 1, Examples 1-2 employing the organic siloxane polymer containing a primary amine group show high impact strength at low temperature and high mechanical strength, compared to Comparative Examples 1-4 employing the organic siloxane polymer without the functional group or the organic siloxane polymer substituted with a secondary amine group.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A polycarbonate resin composition with high impact strength at low temperature and high mechanical strength, comprising:
   (A) about 100 parts by weight of a thermoplastic polycarbonate resin; and
   (B) about 0.1 to about 30 parts by weight of an organic siloxane polymer having a primary amine group, wherein said organic siloxane polymer having a primary amine group (B) is represented by following Chemical Formula 2:

[Chemical Formula 2]

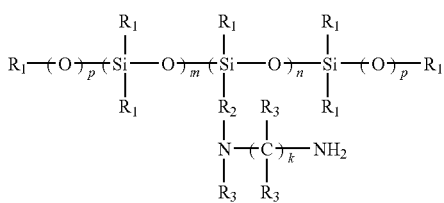

wherein:
   each $R_1$ is independently $C_{1-8}$ alkyl, $C_{6-30}$ aryl, or $C_1$-$C_{15}$ alkyl-substituted $C_{6-30}$ aryl;
   $R_2$ is $C_{1-8}$ alkylene;
   each $R_3$ is independently hydrogen, $C_{1-8}$ alkyl, $C_{6-30}$ aryl, or $C_1$-$C_{15}$ alkyl-substituted $C_{6-30}$ aryl;
   each p is independently 0 or 1;
   k is an integer from 1 to 5; and
   m and n are repeating units, wherein the ratio of m to n of said organic siloxane polymer having a primary amine group is about 99.5:0.5 to about 55:45; and
   (C) about 0.1 to about 10 parts by weight of an impact modifier.

2. The polycarbonate resin composition of claim 1, wherein each $R_1$ is independently methyl, ethyl, propyl, isopropyl, butyl, sec-butyl, t-butyl, isobutyl, isoamyl, or t-amyl, each $R_3$ is independently hydrogen, methyl, ethyl, propyl, isopropyl, butyl, sec-butyl, t-butyl, isobutyl, isoamyl, or t-amyl, and $R_2$ is methylene, ethylene, propylene, isopropylene, butylene, sec-butylene, or t-butylene.

3. The polycarbonate resin composition of claim 1, wherein said polycarbonate resin composition has an impact strength of about 35 kgf·cm/cm or more at 23° C. measured in accordance with ASTM D-256 using a ¼" thick test sample, an impact strength of about 18 kgf·cm/cm or more at −20° C. and about 15 kgf·cm/cm or more at −30° C. measured in accordance with ASTM D-256 using a ¼" thick test sample, and a flexural modulus of about 21,000 Kgf/cm² or more measured in accordance with ASTM D790 using a ¼" thick test sample.

4. The polycarbonate resin composition of claim 1, wherein said impact modifier (C) is a core-shell graft copolymer prepared by grafting a rubber polymer with a monomer comprising an aromatic vinyl compound, cyanide vinyl compound, $C_1$-$C_8$ (meth)acrylic acid alkyl ester, maleic anhydride, maleimide, or a combination thereof.

5. The polycarbonate resin composition of claim 4, wherein said core-shell graft copolymer is a graft copolymer prepared by graft copolymerizing about 5 to about 95% by weight of at least one monomer comprising styrene, α-methylstyrene, halogen- or $C_1$-$C_8$ alkyl-substituted styrene, $C_1$-$C_8$ methacrylic acid alkyl ester, $C_1$-$C_8$ acrylic acid alkyl ester, acrylonitrile, methacrylonitrile, maleic anhydride, $C_1$-$C_4$ alkyl- or phenyl N-substituted maleimide or a combination thereof onto about 5 to about 95% by weight of a rubber polymer comprising butadiene rubber, acrylic rubber, ethylene/propylene rubber, styrene/butadiene rubber, acrylonitrile/butadiene rubber, isoprene rubber, ethylene-propylene-diene terpolymer (EPDM), polyorganosiloxane/polyalkyl (meth)acrylate rubber complex or a combination thereof.

6. The polycarbonate resin composition of claim 5, wherein said polycarbonate resin composition has an impact strength of about 70 kgf·cm/cm or more at 23° C. measured in accordance with ASTM D-256 using a ¼" thick test sample, an impact strength of about 55 kgf·cm/cm or more at −20° C. and about 34 kgf·cm/cm or more at −30° C. measured in accordance with ASTM D-256 using a ¼" thick test sample, and a flexural modulus of about 21,000 Kgf/cm$^2$ or more measured in accordance with ASTM D790 using a ¼" thick test sample.

7. The polycarbonate resin composition of claim 1, wherein said impact modifier (C) comprises an ethylene/alkyl (meth)acrylate copolymer as shown in chemical formula 3:

[Chemical Formula 3]

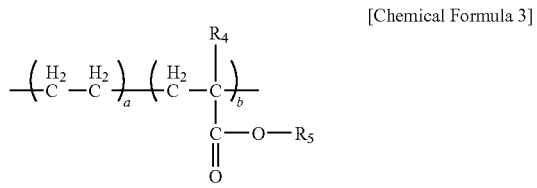

wherein:
R$_4$ is hydrogen or methyl;
R$_5$ is C$_1$-C$_{12}$ alkyl; and
a and b are the degree of polymerization, and a:b is about 300:1 to about 10:90.

8. The polycarbonate resin composition of claim 1, further comprising an additive comprising a flame retardant, flame retardant aid, lubricant, releasing agent, nucleating agent, antistatic agent, stabilizer, modifier, inorganic filler, pigment, dye, or a combination thereof.

9. A molded article produced from the polycarbonate resin composition as defined in claim 1.

10. The polycarbonate resin composition of claim 1, comprising (C) about 0.1 to about 7 parts by weight of said impact modifier.

11. The polycarbonate resin composition of claim 10, comprising (C) about 0.5 to about 5.5 parts by weight of impact modifier.

12. The polycarbonate resin composition of claim 10, comprising (C) about 0.1 to 1.5 parts by weight of said impact modifier.

13. A method for preparing a polycarbonate resin composition comprising:

melt-mixing a thermoplastic polycarbonate resin and an organic siloxane polymer having a primary amine group of Chemical Formula 2;

[Chemical Formula 2]

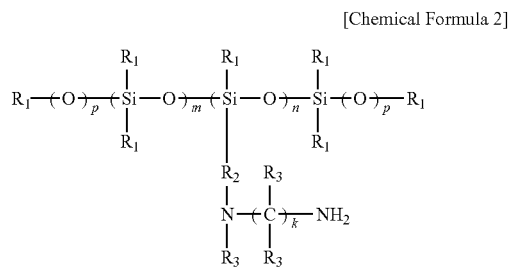

wherein:
each R$_1$ is independently C$_{1-8}$ alkyl, C$_{6-30}$ aryl, or C$_1$-C$_{15}$ alkyl-substituted C$_{6-30}$ aryl;
R$_2$ is C$_{1-8}$ alkylene;
each R$_3$ is independently hydrogen, C$_{1-8}$ alkyl, C$_{6-30}$ aryl, or C$_1$-C$_{15}$ alkyl-substituted C$_{6-30}$ aryl;
each p is independently 0 or 1;
k is an integer of 1 to 5; and
m and n are repeating units and m:n is about 99.9:0.1 to about 50:50; and
extruding the melt-mixed mixture through an extruder.

* * * * *